(12) United States Patent
Itoh (10) Patent No.: US 7,941,704 B2
(45) Date of Patent: May 10, 2011

(54) MAINTENANCE MANAGEMENT SYSTEM, DATABASE SERVER, MAINTENANCE MANAGEMENT PROGRAM, AND MAINTENANCE MANAGEMENT METHOD

(75) Inventor: Chihiro Itoh, Osaka (JP)

(73) Assignee: KYOCERA MITA Corporation, Osaka (JP)

( * ) Notice: Subject to any disclaimer, the term of this patent is extended or adjusted under 35 U.S.C. 154(b) by 355 days.

(21) Appl. No.: 12/106,776

(22) Filed: Apr. 21, 2008

(65) Prior Publication Data
US 2009/0044056 A1    Feb. 12, 2009

(30) Foreign Application Priority Data
Aug. 9, 2007  (JP) ................................ 2007-208176

(51) Int. Cl.
*G06F 11/00*    (2006.01)

(52) U.S. Cl. ........................................ 714/38.1; 714/36
(58) Field of Classification Search ........................ None
See application file for complete search history.

(56) References Cited

U.S. PATENT DOCUMENTS

| | | | | |
|---|---|---|---|---|
| 7,203,723 B2 * | 4/2007 | Ogawa | ........................... | 709/203 |
| 7,246,266 B2 * | 7/2007 | Sneed et al. | ..................... | 714/27 |
| 7,702,896 B1 * | 4/2010 | Polyudov | .......................... | 713/2 |
| 2006/0190773 A1 * | 8/2006 | Rao et al. | ......................... | 714/38 |

FOREIGN PATENT DOCUMENTS

| | | |
|---|---|---|
| JP | 10269107 | 10/1998 |
| JP | 2005202597 | 7/2005 |

* cited by examiner

*Primary Examiner* — Michael C Maskulinski
(74) *Attorney, Agent, or Firm* — Connolly Bove Lodge & Hutz LLP (57) ABSTRACT

A maintenance management system according to the present invention has an electronic device and a database server. In one embodiment of the invention, the electronic device further includes: (1) a log generating unit for collecting states of components and generating a log when a failure is detected during execution of a process; (2) a DB inquiry unit for transmitting the log to the database server and making an inquiry about whether firmware capable of solving the failure exists; and (3) an updating process unit for obtaining firmware capable of solving the failure from the database server and updating firmware in the electronic device with the obtained firmware. In addition, the database server further includes: a storing unit for storing a database having version information of firmware and failure correction information; and an inquiry responding unit for identifying when firmware for solving the failure exists.

8 Claims, 5 Drawing Sheets

| Firmware type | Version | Failure correction information |
|---|---|---|
| prnzzz | 1.5A | Office application, OTF, PS |
| | 1.5B | CAD application, Vector, PCL |
| ⋮ | ⋮ | ⋮ |

MAINTENANCE MANAGEMENT SYSTEM, DATABASE SERVER, MAINTENANCE MANAGEMENT PROGRAM, AND MAINTENANCE MANAGEMENT METHOD

BACKGROUND OF THE INVENTION

1. Field of the Invention

The present invention relates to a maintenance management system, a database server, a maintenance management program, and a maintenance management method.

2. Description of Related Art

Hitherto, in the case where a failure occurs in software provided in a peripheral device such as a printer, the user notifies a software manufacturer or a support center of the failure by telephone or the like, and a service person visits the user or updates firmware from a remote place. Consequently, the time in which the peripheral device is down is long.

As a countermeasure against such a trouble, there is provided a system which encodes a trouble at the time of occurrence of the trouble, transmits an error code to a server, and identifies a countermeasure corresponding to the error code in the server. Another system has been also proposed, which updates firmware of a peripheral device when something abnormal occurs in the peripheral device.

However, there are cases such that firmware is released frequently or various kinds of firmware are released for some of peripheral devices such as a printer. In such a case, there is the possibility such that proper firmware according to the failure situation of the peripheral device is not automatically selected and, even if the firmware in the peripheral device is updated, the failure is not solved with the systems.

SUMMARY OF THE INVENTION

An object of the present invention is to obtain a maintenance management system, a database server, a maintenance management program, and a maintenance management method for automatically selecting proper firmware according to a failure state of an electronic device and solving a problem of the electronic device.

A maintenance management system according to one embodiment of the invention includes an electronic device and a database (DB) server. The electronic device further includes: a log generating unit for collecting states of components and for generating a log when a failure is detected during execution of a process; a DB inquiry unit for transmitting the log to the database server and making an inquiry about whether firmware capable of solving the failure exists; and an updating process unit for obtaining first firmware capable of solving the failure from the database server and updating second firmware in the electronic device with the first firmware. The database server further includes: a storing unit for storing a database having version information of the first firmware and failure correction information indicative of a failure corrected by the first firmware, wherein the version information and failure correction information are associated with each other; and an inquiry responding unit for identifying when the first firmware for solving the failure is present and identifying version information of the first firmware with reference to the database on the basis of the log from the electronic device and the inquiry about whether the first firmware for solving the failure exists, and transmitting the information of the firmware for solving the failure as a response.

A maintenance management system according to another embodiment of the invention includes an electronic device, a database (DB) server, and a data processor configured to use the electronic device. The electronic device further includes: a log generating unit for collecting states of components in case a failure is detected during execution of a process and generating a log; and an updating process unit for obtaining first firmware for solving the failure from the database server and updating second firmware in the electronic device with the first firmware. The data processor includes: a high-order application processor for executing a data process on a basis of an application program or the like and for using the electronic device; a log merging unit for merging information of the high-order application processor to the log generated by the log generating unit; and a DB inquiry unit for transmitting the log to which the information of the high-order application processor is merged to the database server and for making an inquiry about whether firmware capable of solving the failure exists. The database server further includes: a storing unit for storing a database having version information of the first firmware and failure correction information indicative of a failure corrected by the first firmware, wherein the version information and failure correction information are associated with each other; and an inquiry responding unit for identifying when first firmware for solving the failure and version information of the first firmware with reference to the database on the basis of the log and the inquiry for about whether the first firmware for solving the failure exists, and transmitting the version information of the first firmware for solving the failure as a response to the electronic device or the data processor.

A maintenance management system in accordance to yet another embodiment of the invention includes: a database (DB) server; a computer; an electronic device; and a communication apparatus configured to provide communications between the DB server, computer and electronic device. The first firmware is requested from the DB server in accordance with a failure mode in the electronic device, communicated to the electronic device via the communication apparatus and executed to update second firmware in the electronic device causing the failure mode.

According to the present invention, proper firmware adapted to a failure state of an electronic device is automatically selected from a plurality of pieces of firmware, and a failure in the electronic device can be solved.

These and other objects, embodiments, features, aspects and advantages of the present invention will become more apparent from the following detailed description of the present invention when taken in conjunction with the accompanying drawings.

DESCRIPTION OF PREFERRED EMBODIMENTS

Embodiments of the present invention will be described hereinbelow with reference to the drawings.

First Embodiment

Figure 1:
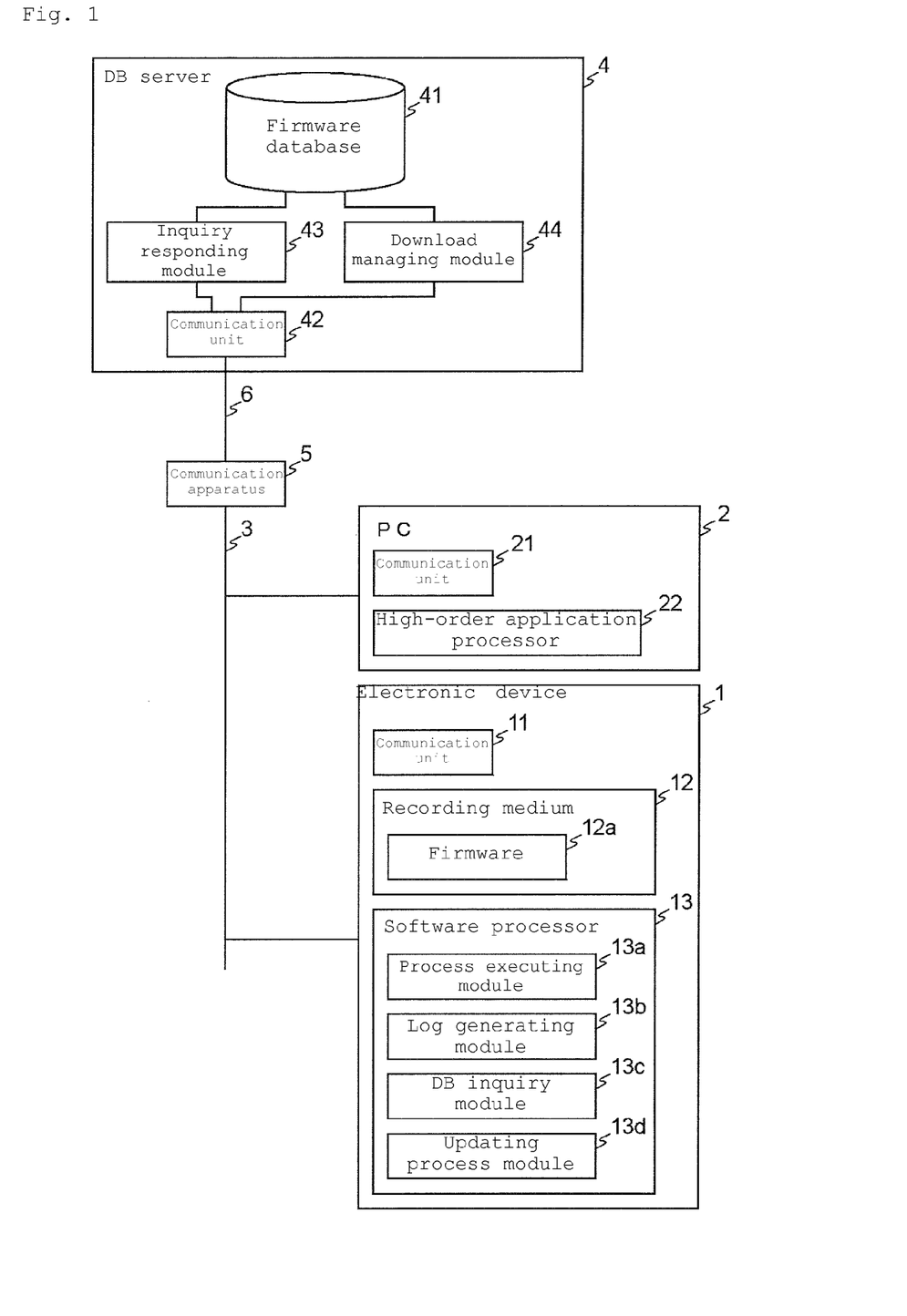
FIG. 1 is a block diagram showing the configuration of a maintenance management system of a first embodiment of the present invention.

FIG. 1 is a block diagram showing the configuration of a maintenance management system as a first embodiment of the present invention. In FIG. 1, an electronic device 1 is an electronic device for receiving data from a data processor such as a personal computer and executing a predetermined process on the data. Examples of the electronic device 1 are a printing apparatus such as a printer and a MFP (Multi-Function Peripheral), a storage device for storing data, and a communication device for performing data communication.

In the electronic device 1, a communication unit 11 is a processor for performing data communication with another device. The recording medium 12 is a rewritable nonvolatile memory or a rewritable medium using magnetism or light for storing firmware 12a. The firmware 12a is a program for controlling hardware in the electronic device 1. A software processor 13 is a processor for performing a data process which can be executed in the electronic device 1. The software processor 13 is realized when a program describing a process is executed by a microprocessor or the like. The software processor 13 has a process executing module 13a, a log generating module 13b, a DB inquiry module 13c, and an updating process module 13d.

The process executing module 13a is a processor for realizing the function of the electronic device 1. For example, when the electronic device 1 is a printer, the process executing module 13a executes necessary data process and control at the time of printing.

The log generating module 13b is a processor for collecting states of the components and generating a log when a failure is detected during execution of the process of the process executing module 13a. The log generating module 13b includes, in the log, at least one of a type of the software processor 13, version information of the software processor 13, information identifying a failure-occurred module in the software processor 13, version information of the failure-occurred module, and a part or all of information of the type of an error occurred. With the information, the module in which the failure occurs can be identified, and proper firmware adapted to the failure state can be selected more easily. The log generating module 13b functions as a log generating unit.

The DB inquiry module 13c transmits the log generated by the log generating module 13b to a database server 4 and inquires whethere firmware for solving the failure. The DB inquiry module 13c functions as a DB inquiry unit.

The updating process module 13d is a processor for obtaining first firmware capable of solving the failure from the database server 4 and updating the firmware 12a(second firmware) in the electronic device 1 by the first firmware. The updating process module 13d functions as an updating process unit.

A personal computer (hereinbelow, PC) 2 is a data processor capable of using the electronic device 1. In the PC 2, by a not-shown hardware configuration such as a CPU (Central Processing Unit), a ROM (Read Only Memory), and a RAM (Random Access Memory), an operating system (OS), an application program, and the like are executed, and various processors are realized. A communication unit 21 is a processor for performing data communication with another apparatus. A high-order application processor 22 is a processor realized when a device driver program, a utility program, an application program (for example, an office application and a CAD application), or the like is executed. The high-order application processor 22 supplies data to the electronic device 1, and starts (the operation of) the process executing module 13a in the electronic device 1 to execute a predetermined process.

An LAN 3 is a local area network of computers, for example, laid in a company or the like. To the LAN 3, the electronic device 1 and the PC 2 are connected. The devices connected to the LAN 3 can perform data communication to each other via the LAN 3.

The database server (hereinbelow, called DB server) 4 receives an inquiry regarding a failure in the electronic device 1. The DB server 4 is realized when a server program is executed by a built-in computer.

Figure 2:
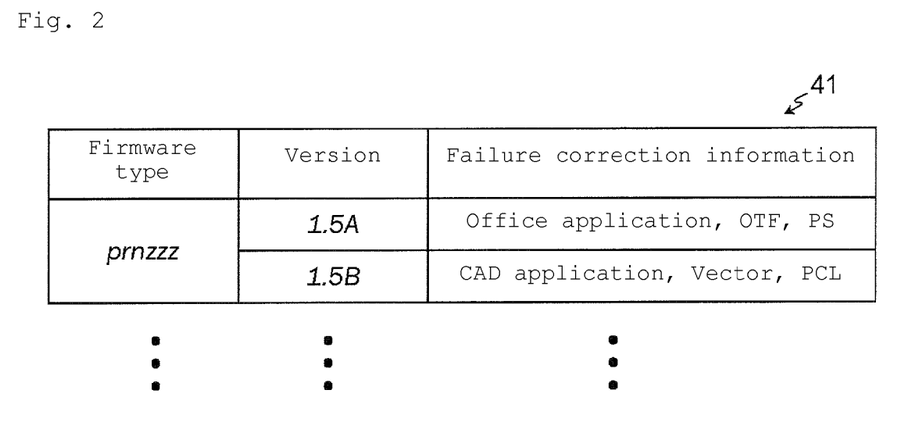
FIG. 2 is a diagram showing an example of firmware information recorded in a firmware database in FIG. 1.

In the DB server 4, a firmware database 41 stores the version information of the first firmware and failure correction information indicative of a failure solved by the version so as to be associated with each other. The firmware database 41 is formed on a storage unit such as a hard disk drive, a disk array, or a semiconductor memory. FIG. 2 is a diagram showing an example of firmware information recorded in the firmware database 41 in FIG. 1. As shown in FIG. 2, in the firmware database 41, the firmware type, version information, and failure correction information are stored so as to be associated with one another. The failure correction information is information of a failure corrected by the version One or plural versions and failure correction information for the version(s) are associated with a single firmware type. In the example of FIG. 2, firmware "prnzzz" has a plurality of downloadable versions (versions 1.5A and 1.5B). Version 1.5A is firmware in which failures related to OTF (Open Type Font) and PS (Post Script) in an office application are corrected. Version 1.5B is firmware in which a failure related to PCL (Printer Control Language) in vector expression in a CAD application is corrected.

A communication unit 42 is a processor for performing data communication with another apparatus.

An inquiry responding module 43 is realized when a not-shown server program is executed. The inquiry responding module 43 is a processor for receiving an inquiry accompanying a log of the electronic device 1 on occurrence of a failure via the communication unit 42. In response to the inquiry, referring to the firmware database 41, the inquiry responding module 43 identifies when the first firmware for solving the failure is present, identifies the version information of the first firmware, and transmits the version information of the first firmware for solving the failure as a response. The inquiry responding module 43 functions as an inquiry responding unit.

A download managing module 44 is realized when a not-shown server program is executed. The download managing module 44 is a processor for reading a file of designated firmware from a not-shown recording medium in response to a download request from the electronic device 1 or the PC 2 received via the communication unit 42, and transmitting the file to the transmitter of the download request.

A communication apparatus 5 is a network device such as a router connected to the LAN 3 and can perform data communication with the DB server 4 via a communication path 6. As the communication path 6, a subscriber's line, an optical line, the Internet, a dedicated line, or the like is used.

Figure 3:
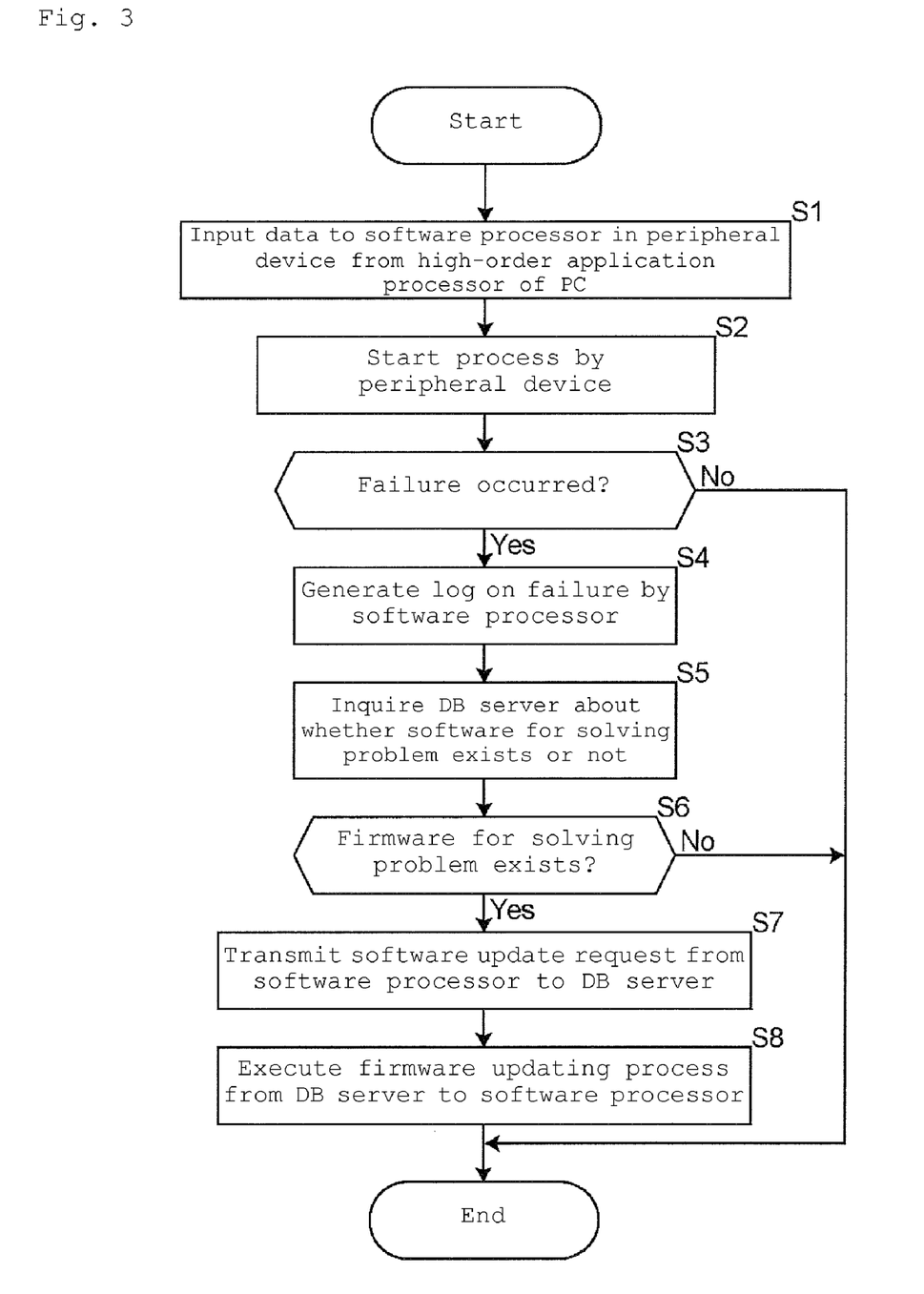
FIG. 3 is a flowchart showing processes in the system of the first embodiment.

Subsequently, the operation of the apparatuses in the system will be described. FIG. 3 is a flowchart showing processes in the system of the first embodiment.

First, the high-order application processor 22 of the PC 2 inputs data to the electronic device 1 via the LAN 3 (step S1). For example, when the electronic device 1 is a printer, the high-order application processor 22 transmits print data to the electronic device 1. In the electronic device 1, the process executing module 13a receives the data via the communication unit 11.

The process executing module 13a of the electronic device 1 starts execution of a predetermined process on the basis of the received data (step S2). For example, when the electronic device 1 is a printer, a series of processes of performing an imaging process on the received data, controlling a printing mechanism on the basis of the processed data and performing printing are started. The mechanism such as the printing mechanism operates on the basis of the firmware 12a.

After start of the processes, the process executing module 13a monitors occurrence of a failure (step S3). When a failure is detected, the log generating module 13b generates a log indicative of the internal state upon occurrence of the failure (step S4).

When the log is generated, the DB inquiry module 13c accesses the DB server 4 via the communication unit 11, the LAN 3, the communication apparatus 5, and the communication path 6 and transmits an inquiry including the log to the DB server 4 (step S5).

In the DB server 4, the inquiry response module 43 receives the inquiry via the communication unit 42, extracts the log from the inquiry, and identifies the failure in the electronic device 1 on the basis of the log. The inquiry responding module 43 retrieves the firmware type and the failure correction information in the firmware database 41 and determines whether the version of the firmware by which the failure reported in the log is corrected exists (step S6).

The inquiry responding module 43 transmits the determination result as a response to the DB inquiry module 13c in the electronic device 1. On the basis of the determination result, when the version of firmware by which the failure reported in the log is corrected exists, the update processing module 13d displays notification of the existence of first firmware for solving the failure and a message prompting to enter whether the firmware 12a can be updated or not on a not-shown display unit for the user. The update processing module 13 waits until an input operation of the user on the not-shown operating unit is detected. When an operation of permitting updating of firmware is detected, the update processing module 13d transmits a firmware update request designating the version of the first firmware to the DB server 4 (step S7). In the DB server 4, the download managing module 44 receives the request via the communication unit 42, reads the designated first firmware, and supplies the read first firmware to the updating process module 13d. On receipt of the first firmware, the updating process module 13d updates the firmware 12a(second firmware) in the recording medium 12 by overwriting the updating process with the received first firmware (step S8).

When no failure is detected in step S3, a process directed to occurrence of a failure is not performed. When the version of the second firmware by which the failure reported in the log is corrected does not exist on the basis of the determination result in step S6, the updating process module 13d displays a message notifying the user of the absence of firmware for solving the failure and finishes the process.

As described above, according to the first embodiment, in the electronic device 1, when a failure is detected during execution of the process, the log generating module 13b collects the states of the components and generates a log. The DB inquiry module 13c transmits the log to the DB server 4 and inquires whether the first firmware capable of solving the failure exists The updating process module 13d obtains first firmware capable of solving the failure and updates the firmware 12a (the second firmware) in the electronic device 1 with the first firmware. In the DB server 4, on the basis of the log on occurrence of the failure and the inquiry of the presence or absence of the first firmware capable of solving the failure, the inquiry responding module 43 refers to the firmware database 41 to see whether there is the first firmware capable of solving the failure. When there is the first firmware capable of solving the failure, the inquiry responding module 43 identifies the version information of the first firmware and transmits the version information of the first firmware for solving the failure as a response.

As a result, proper firmware adapted to the failure state of the electronic device 1 is automatically selected, the firmware 12a of the electronic device 1 is updated with the selected the first firmware, and the failure in the electronic device 1 can be solved without depending on a serviceperson. By extension, time in which the electronic device 1 is down becomes shorter.

In the first embodiment, after a predetermined operation is performed by the user to which a response of the inquiry responding module 43 is notified, the updating process module 13d obtains first firmware capable of solving the failure from the DB server 4. In such a manner, the user can clearly recognize that second firmware has been updated and can be prevented from contacting a support center or the like in spite of the fact that the failure has been solved.

Second Embodiment

In a maintenance management system according to a second embodiment of the present invention, at the time of inquiring a failure, information of an application program in a PC or the like is added to a log in the electronic device 1.

Figure 4:
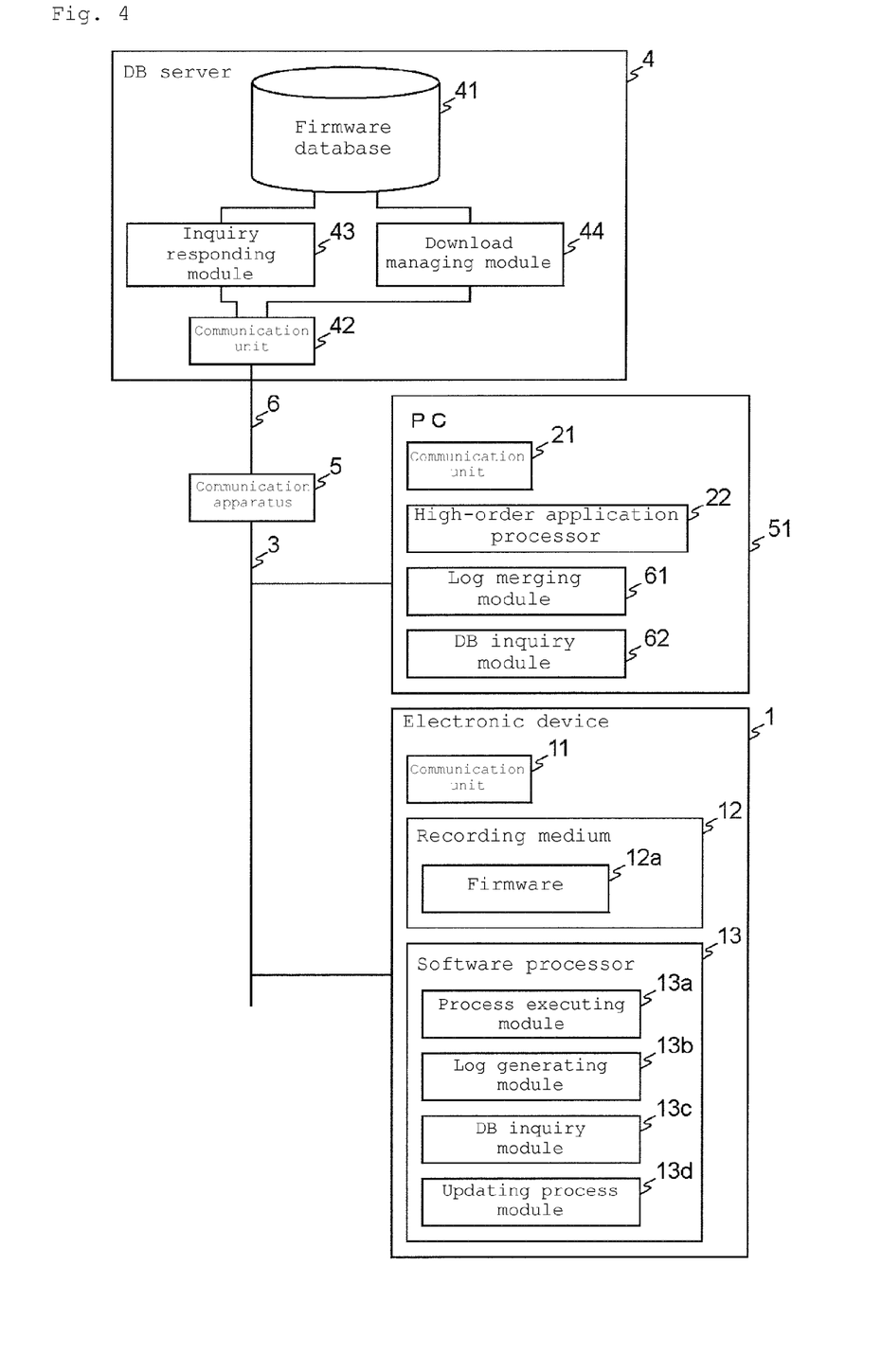
FIG. 4 is a block diagram showing the configuration of a maintenance management system as a second embodiment of the invention.

FIG. 4 is a block diagram showing the configuration of the maintenance management system of the second embodiment of the invention. In FIG. 4, a PC 51 is an apparatus similar to the PC 2 of the first embodiment. The PC 51 reads a maintenance management program stored in a not-shown recording medium such as a hard disk drive, an optical recording medium, or the like and executes the maintenance management program by a processor such as a CPU, thereby realizing various processors. In the PC 51, on the basis of the maintenance management program, in addition to the communication unit 21 and the high-order application processor 22, a log merging module 61 and a DB inquiry module 62 are realized.

The log merging module 61 is a processor for obtaining the log generated by the log generating module 13b from the electronic device 1 and merging information of the high-order application processor 22 to the log. At this time, the log merging module 61 adds, as information of the high-order application processor 22, part or all of (a) name, (b) version information, (c) setting state, and (d) information of an OS by which the program operates with respect to each of programs to the log of the electronic device 1. With the information, the use environment when a failure occurs can be identified, and proper firmware adapted to the failure state can be selected more easily. The log merging module 61 functions as a log merging unit.

The DB inquiry module 62 is a processor similar to the DB inquiry module 13c of the first embodiment, and transmits an inquiry including a log with which the information of the application program is merged by the log merging module 61 to the DB server 4. The DB inquiry module 62 functions as a DB inquiry unit.

The other components of each of the apparatuses in the second embodiment are similar to those of the first embodiment. In the second embodiment, the inquiry responding module 43 transmits a response indicative of the presence or absence of first firmware to the inquiry to the DB inquiry module 13c in the electronic device 1.

Figure 5:
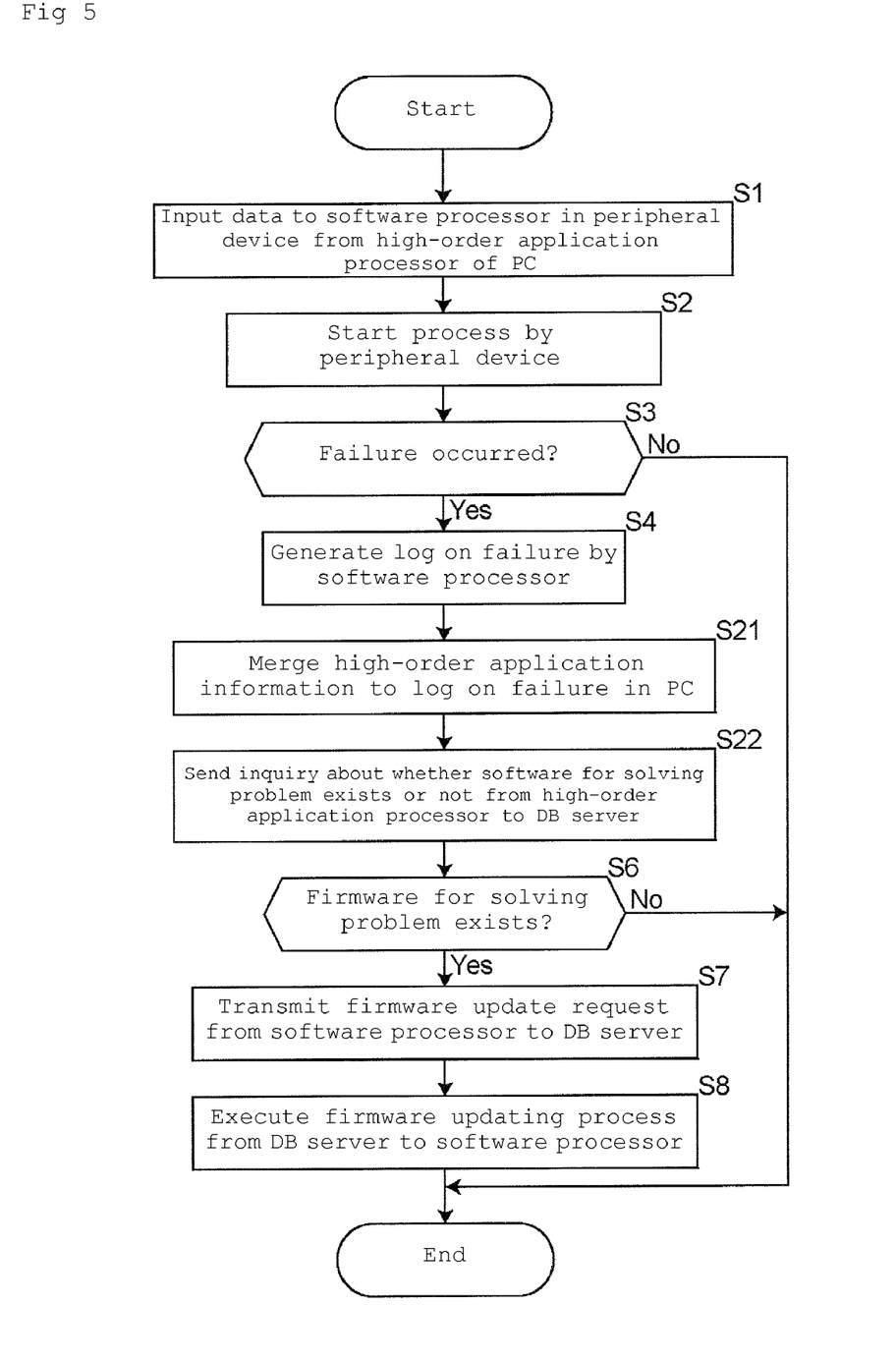
FIG. 5 is a flowchart showing processes in the system of the second embodiment.

The operations of the apparatuses in the system will now be described. FIG. 5 is a flowchart illustrating the processes in the system of the second embodiment.

In the second embodiment, a failure occurs in the electronic device 1 and the log generating module 13b generates a log. After that, the log merging module 61 in the PC 51 obtains the generated log from the electronic device 1 and merges the information of the high-order application processor 22 to the log (step S21). The DB inquiry module 62 of the PC 51 sends an inquiry to the DB server 4 (step S22). The inquiry includes the log to which the information of the high-order application processor 22 is merged.

On the other hand, after the log generating module 13b generates the log, the DB inquiry module 13c of the electronic device 1 does not send an inquiry to the DB server 4 but waits to receive a response from the DB server 4.

When the DB inquiry module 13c in the electronic device 1 receives the response to the inquiry from the DB server 4, the software processor 13 executes a process similar to that of the first embodiment.

Since the other processes in the second embodiment are similar to those of the first embodiment, their description will not be repeated.

As described above, in the second embodiment, the PC 51 has: the log merging module 61 for merging the information of the high-order application processor 22 to a log generated by the log generating module 13b; and the DB inquiry module 62 for transmitting the log to which the information of the high-order application processor 22 is merged to the DB server 4 and making an inquiry about whether firmware for the failure exists. With the configuration, proper firmware can be further narrowed on the basis of the information of the application program or the like used in the PC 51, and more appropriate firmware is selected Consequently, a failure is solved more properly.

While the invention has been shown and described in detail, the foregoing description is in all aspects illustrative and not restrictive. It is therefore understood that numerous modifications and variations can be devised without departing from the scope of the invention.

For example, in the second embodiment, the electronic device 1 receives a response from the inquiry responding module 43 and downloads first firmware from the DB server 4. Instead of the method, the DB inquiry module 62 in the PC 51 may receive the response from the inquiry responding module 43, download the first firmware from the DB server 4, and install it to the electronic device 1. Alternatively, the DB inquiry module 62 in the PC 51 may receive a response from the inquiry responding module 42 and notify the updating process module 13d in the electronic device 1 of the information of the first firmware for solving the failure. The updating process module 13d may download the first firmware.

In the foregoing embodiments, a plurality of pieces of latest firmware according to types of failures exist. The invention can be also applied to the case where only one piece of the latest firmware exists and a series of old and new firmware exist. In such a case as well, there is the possibility that firmware of an old version is selected according to information (mainly, the version) of the application program.

Although the electronic device 1 of the PC 2 is described as an example of an electronic device in the first embodiment, the electronic device 1 may be an electronic device which does not work with the PC 2.

Although the log merging module 61 is provided separately from the high-order application processor 22 in the second embodiment, the high-order application processor 22 may include the log merging module 61.

The present invention will be summarized on the basis of the foregoing embodiments as follows. A maintenance management system according to one embodiment of the present invention has an electronic device and a database server. The electronic device includes: a log generating unit for collecting states of components and for generating a log when a failure is detected during execution of a process; a DB inquiry unit for transmitting the log to the database server and making an inquiry about whether firmware capable of solving the failure exists; and an updating process unit for obtaining first firmware capable of solving the failure from the database server and updating second firmware in the electronic device with the first firmware. In addition, the database server further includes: a storing unit for storing a database having version information of the first firmware and failure correction information indicative of a failure corrected by the first firmware, wherein the version information and failure correction information are associated with each other; and an inquiry responding unit for identifying when the first firmware for solving the failure is present and identifying version information of the first firmware with reference to the database on the basis of the log from the electronic device and the inquiry about whether the first firmware for solving the failure exists, and transmitting the version information of the firmware for solving the failure as a response.

With the configuration, proper firmware according to a failure state of an electronic device is automatically selected, firmware of the electronic device is updated with the selected firmware, and a failure in the electronic device can be solved without depending on a serviceperson. By extension, time in which the electronic device is down becomes shorter.

A maintenance management system according to another embodiment of the invention includes an electronic device, a database server, and a data processor configured to use the electronic device. The electronic device further includes: a log generating unit for collecting states of components in case a failure is detected during execution of a process and generating a log; and an updating process unit for obtaining first firmware for solving the failure from the database server and updating second firmware in the electronic device with the first firmware. The data processor further includes: a high-order application processor for executing a data process on a basis of at least one of an application program, a device driver program, and a utility program and for using the electronic device; a log merging unit for merging information of the high-order application processor to the log generated by the log generating unit; and a DB inquiry unit for transmitting the log to which the information of the high-order application processor is merged to the database server and for making an inquiry about whether firmware capable of solving the failure exists. The database server further includes: a storing unit for storing a database having version information of the first firmware and failure correction information indicative of a failure corrected by the first firmware, wherein the version information and failure correction information are associated with each other; and an inquiry responding unit for identifying when first firmware for solving the failure and version information of the first firmware with reference to the database on the basis of the log and the inquiry for about whether the first firmware for solving the failure exists, and transmitting the version information of the first firmware for solving the failure as a response to the electronic device or the data processor.

With the configuration, proper firmware according to a failure state of an electronic device is automatically selected, the second firmware of the electronic device is updated with the selected first firmware, and a failure in the electronic device can be solved without depending on a serviceperson. By extension, time in which the electronic device is down becomes shorter. Proper firmware can be further narrowed on the basis of the information of the application program or the like used, and more appropriate firmware is selected. Consequently, a failure is solved more properly.

The maintenance management system according to the invention may be also constructed as follows. The electronic device includes a software processor for performing a process in accordance with internal software. The log generating unit includes, in the log, at least one of a type of the software processor, version information, information identifying a failure-occurred module in the software processor, and an error type.

With the configuration, a module in which a failure occurs can be identified, and proper firmware adapted to a failure state can be selected more easily.

A maintenance management system in accordance to yet another embodiment of the invention includes: a database (DB) server; a computer; an electronic device; and a communication apparatus configured to provide communications between the DB server, computer and electronic device. The first firmware is requested from the DB server in accordance with a failure mode in the electronic device, communicated to the electronic device via the communication apparatus and executed to update second firmware in the electronic device causing the failure mode.

The maintenance management system according to the invention may be also constructed as follows in addition to any of the above-mentioned maintenance management systems. The log merging unit merges, as information for the high-order application processor, at least one of a name of a program, version information of the program, a setting state of the program, and OS information.

With the configuration, a use environment upon occurrence of a failure can be identified and proper firmware adapted to a failure state can be selected more easily.

The maintenance management system according to the invention may be also constructed as follows. After a predetermined operation is performed by a user to which a response of the inquiry response unit is notified, the updating process unit obtains first firmware for solving the failure from the database server.

With the configuration, the user can clearly recognize that the firmware has been updated and can be prevented from contacting a support center or the like in spite of the fact that the failure has been solved.

A database server according to the present invention includes: a storing unit for storing a database having version information of firmware of an electronic device and failure correction information indicative of a failure corrected by the version of first firmware so as to be associated with each other; and an inquiry responding unit for identifying when the first firmware for solving the failure is present and, identifying version information of the first firmware with reference to the database on the basis of a log indicating an internal state of the electronic device on occurrence of a failure and an inquiry for about whether the first firmware for solving the failure exists, and transmitting the version information of the firmware for solving the failure as a response.

With the configuration, proper firmware according to a failure state of an electronic device is automatically selected, the second firmware of the electronic device is updated with the selected first firmware, and a failure in the electronic device can be solved without depending on a serviceperson. By extension, time in which the electronic device is down becomes shorter.

A maintenance management program according to the present invention is recorded on a computer-readable recording medium and makes computer function as: a high-order application processor for executing a data process on a basis of at least one of an application program, a device driver program, and a utility program and using an electronic device; a log merging unit for merging information of the high-order application processor to the log generated by the electronic device upon occurrence of a failure; and a DB inquiry unit for transmitting the log to which the information of the high-order application processor is merged to the database server and making an inquiry about whether firmware for the electronic device, and for solving the failure exists.

With the configuration, proper firmware according to a failure state of an electronic device is automatically selected, the second firmware of the electronic device is updated with the selected first firmware, and a failure in the electronic device can be solved without depending on a serviceperson. By extension, time in which the electronic device is down becomes shorter. Proper firmware can be further narrowed on a basis of the information of the application program or the like used, and more appropriate firmware is selected. Consequently, a failure is solved more properly.

A maintenance management method according to the present invention includes the steps of: collecting states of components of the electronic device and generating a log in the case where a failure is detected during execution of a process of the electronic device; transmitting the log to the database server and making an inquiry about whether firmware for solving the failure exists; identifying when the first firmware for solving the failure is present and, version information of the first firmware with reference to a database having version information of the first firmware and failure correction information indicative of a failure corrected by the version of the first firmware so as to be associated with each other on the basis of the log from the electronic device and the inquiry for about whether firmware for solving the failure exists; and obtaining the first firmware capable of solving the failure from the database server and updating second firmware in the electronic device with the first firmware.

With the configuration, proper firmware according to a failure state of an electronic device is automatically selected, the second firmware of the electronic device is updated with the selected first firmware, and a failure in the electronic device can be solved without depending on a serviceperson. By extension, time in which the electronic device is down becomes shorter.

According to the present invention, proper firmware adapted to a failure state of an electronic device is automatically selected from a plurality of pieces of firmware, and a failure in the electronic device can be solved.

What is claimed is:

1. A maintenance management system comprising:
an electronic device; and
a database (DB) server connected to the electronic device, the electronic device further comprising:
a software processor for performing a process in accordance with internal software;
a log generating unit for collecting states of components and for generating a log when a failure is detected during execution of a process of the software processor;
a DB inquiry unit for transmitting the log to the database server and making an inquiry about whether firmware capable of solving the failure exists; and an updating process unit for obtaining first firmware capable of solving the failure from the database server and updating second firmware in the electronic device with the first firmware, and the database server further comprising:

a storing unit for storing a database having version information of the first firmware and failure correction information indicative of a failure corrected by the first firmware, wherein the version information and failure correction information are associated with each other; and an inquiry responding unit for identifying when the first firmware for solving the failure is present and identifying version information of the first firmware with reference to the database on the basis of the log from the electronic device and the inquiry about whether the first firmware for solving the failure exists, and transmitting the version information of the firmware for solving the failure as a response, wherein the failure correction information includes information associated with a high-order application related to the failure; and wherein the high-order application includes at least one of an application program, a device driver program, or a utility program and is executed by a data processor configured to use the electronic device.

2. The maintenance management system according to claim 1, wherein the log generating unit includes, in the log, at least one of a type of the software processor, version information, information identifying a failure-occurred module in the software processor, and an error type.

3. The maintenance management system according to claim 1, wherein after a predetermined operation is performed by a user to which a response of the inquiry response unit is notified, the updating process unit obtains first firmware for solving the failure from the database server.

4. A maintenance management system comprising:

an electronic device;

a database (DB) server connected to the electronic device; and a data processor configured to use the electronic device, the electronic device further comprising:

a software processor for performing a process in accordance with internal software;

a log generating unit for collecting states of components in case a failure is detected during execution of a process of the software processor and generating a log; and an updating process unit for obtaining first firmware for solving the failure from the database server and updating second firmware in the electronic device with the first firmware, the database server further comprising:

a storing unit for storing a database having version information of the first firmware and failure correction information indicative of a failure corrected by the first firmware, wherein the version information and failure correction information are associated with each other; and an inquiry responding unit for identifying when first firmware for solving the failure and version information of the first firmware with reference to the database on the basis of the log and the inquiry for about whether the first firmware for solving the failure exists, and transmitting the version information of the first firmware for solving the failure as a response to the electronic device or the data processor, and the data processor including:

a high-order application processor for executing a data process on a basis of at least an application program and for using the electronic device;

a log merging unit for merging information of the high-order application processor to the log generated by the log generating unit; and a DB inquiry unit for transmitting the log to which the information of the high-order application processor is merged to the database server and for making an inquiry about whether firmware capable of solving the failure exists, wherein the information of the high-order application processor includes information of the application program that is executed by the high-order application processor.

5. The maintenance management system according to claim 4, wherein the log generating unit includes, in the log, at least one of a type of the software processor, version information, information identifying a failure-occurred module in the software processor, and an error type.

6. The maintenance management system according to claim 4, wherein the log merging unit merges at least one of a name of a program, version information of the program, a setting state of the program, and OS information as information for the high-order application processor.

7. The maintenance management system according to claim 4, wherein after a predetermined operation is performed by a user to which a response of the inquiry response unit is notified, the updating process unit obtains first firmware for solving the failure from the database server.

8. A storage medium storing a computer-readable maintenance management program for making a computer function as:

a high-order application processor for executing a data process on a basis of at least one of an application program, a device driver program, and a utility program; and using an electronic device;

a log merging unit for merging information of the high-order application processor to the log generated by the electronic device upon occurrence of a failure; and a DB inquiry unit for transmitting a log to which the information of the high-order application processor is merged to the database server and making an inquiry about whether firmware for the electronic device and for solving the failure exists, wherein the information of the high-order application processor includes information of an application program that is executed by the high-order application processor.

* * * * *